UNITED STATES PATENT OFFICE.

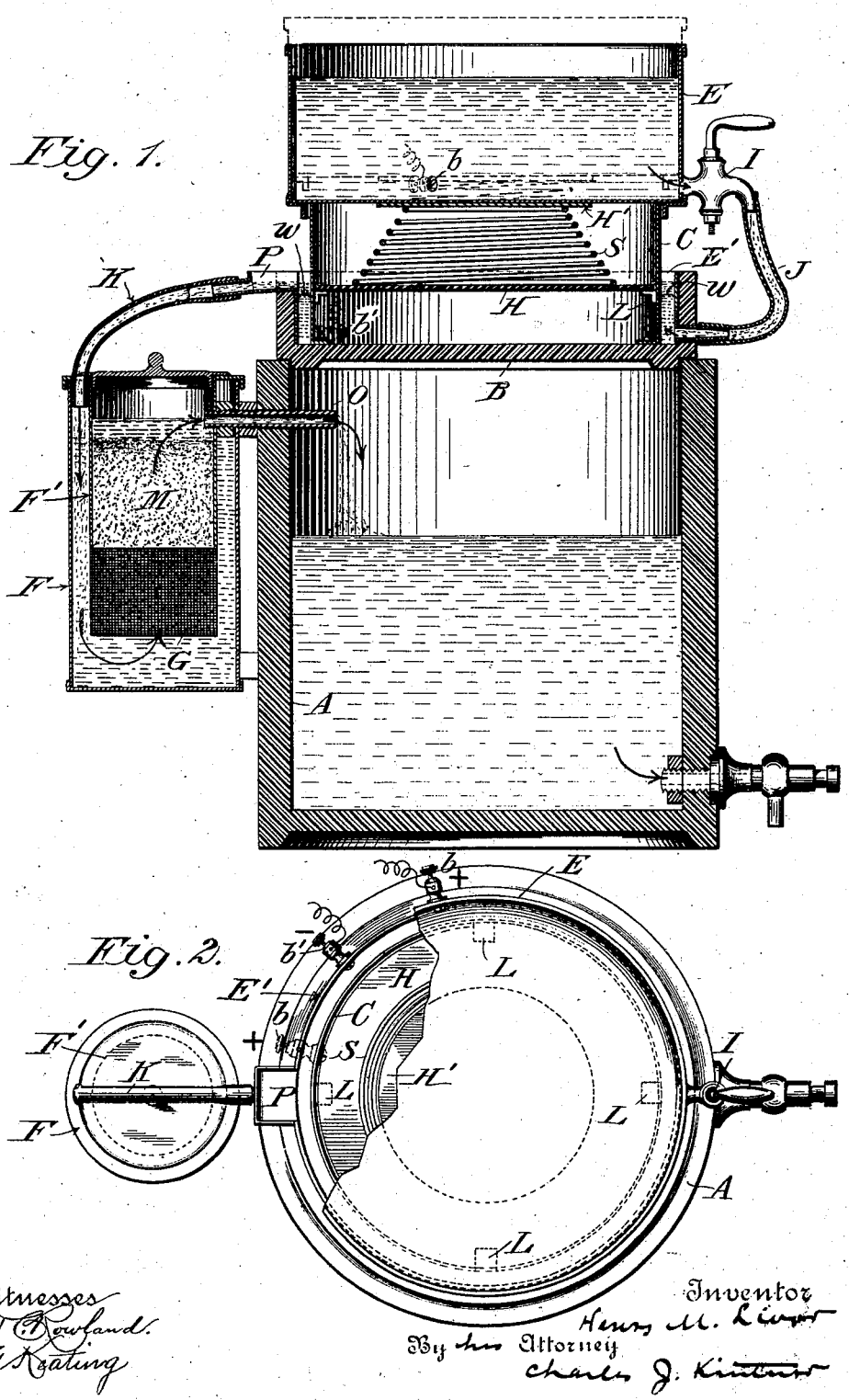

HENRY M. LIVOR, OF NEW YORK, N. Y., ASSIGNOR TO IPHEGENIA Z. PLACE, OF NEW YORK, N. Y.

APPARATUS FOR PURIFYING WATER.

SPECIFICATION forming part of Letters Patent No. 718,485, dated January 13, 1903.

Application filed May 7, 1902. Serial No. 106,275. (No model.)

*To all whom it may concern:*

Be it known that I, HENRY M. LIVOR, a citizen of the United States, residing at New York, in the borough of Manhattan, county and State of New York, have made a new and useful Invention in Apparatus for Purifying Water, of which the following is a specification.

My invention is directed particularly to an apparatus for purifying water through the agency of an electrical current and filtering apparatus combined therewith; and to this end it consists in the novel apparatus illustrated in the accompanying drawings and described in the following specification, the especial points of novelty being particularly pointed out in the claims at the end thereof.

For a full and clear understanding of the invention, such as will enable others skilled in the art to construct and use the same, reference is had to the accompanying drawings, in which—

Figure 1 is a longitudinal sectional view taken through a water-cooler or supply-chamber, a filter, and my novel electrical purifying apparatus as combined therewith; and Fig. 2 is a plan view as seen looking at Fig. 1 from the top toward the bottom of the drawings, a part of the upper portion of the apparatus being broken away to better illustrate the interior structure thereof.

My invention comprehends a simple form of electrolyzing-chamber, in which the chamber itself is made, preferably, of one integral piece of insulating material and the electrodes secured therein, the outer electrode being secured directly to the inner wall of the chamber and the inner electrode by one end only to the bottom of the chamber and in such manner that all parts of the two electrodes are at all times concentric with each other.

It comprehends also a novel arrangement of apparatus whereby when the water in the supply-tank is practically all exhausted the circuit to the source of electrical supply is automatically interrupted, thereby avoiding any waste of current.

My invention comprehends also the combination of such an apparatus with a filter in which the filtering action is from the bottom toward the top thereof, thus causing the water to be acted upon as it ascends therefrom in the same manner as it was acted upon electrically as it ascended through the electrolyzing-chamber. In other words, my invention contemplates the subjection of the entire volume of water to the action of an electrical current before it passes to the filter and in like manner the subjection of the water to the filter, so as to insure the best filtering action thereto before it reaches the final supply-chamber.

Referring now to the drawings in detail, A represents a water-cooler or supply-chamber, made, preferably, of insulating material, to one side of which is secured in any preferred manner a filter having a containing vessel F and an interior filtering-chamber F', the lower end of which is provided with a wire-gauze or other netting G of cylindrical form, said wire-gauze portion and filtering-chamber F' being filled with sand M to a definite point.

O is an outlet-spout from the filter to the cooler or supply-chamber.

B represents my novel form of electrode-containing chamber, constituting what I term the "electrolyzing-chamber," the same being constructed, preferably, of insulating material in one integral piece and having at its bottom a flange adapted to fit snugly within the supply-chamber A. To the inner wall of the chamber B is secured a closely-fitting metallic cylinder E', made, preferably, of aluminium and constituting one of the electrodes of the electrolyzing-chamber. The other electrode is composed of a metallic cylinder C, made also, preferably, of aluminium and having an inwardly-turned flange at its bottom by which it is secured by screws or otherwise to the bottom of the chamber B concentric with the outer electrode E', after which any sealing agent, as wax or like material, is applied around the inner surface, so as to prevent water from entering at the bottom of the cylinder.

L L L L are brackets on the inner surface of the electrode C, upon which rests an insulating-disk H, adapted to support at its lower end a strong spiral spring S, the upper end of which bears in like manner against an insulating-disk H', secured to the bottom of the metallic water-supply chamber E, which rests normally with its bottom upon the upper cylindrical electrode C, thus making good electrical contact therewith. The water-supply chamber E is also provided with a guiding-flange about its lower edge, adapted to guide said chamber in its upward and downward movement.

$b$ is an electrical binding-post connected to the water-supply chamber E, and $b'$ is a similar binding-post connected to the other electrode E'.

I is a water-cock connected to the water-supply chamber E, and J is a flexible tube connecting said cock with the electrolyzing-chamber between the electrodes C and E' and at the bottom thereof, as clearly indicated, so that the water-supply $w$ will always enter at the extreme lower surface of said chamber.

P is an overflow-pan located directly opposite the tube J and cock I and constituting a part of the electrode E', said pan being connected in turn by a flexible pipe or tube K with the filter F and at the top thereof, as shown.

The operation is as follows: The supply-chamber E is filled with water, under which condition said chamber rests firmly with its metallic bottom upon the upper end of the electrode C, making good electrical contact therewith and maintaining the strong spiral spring S under compression, the tendency of the latter being to lift said chamber into the position shown in dotted lines, which tendency, however, is overcome by the weight of the water. A source of electrical energy, as a battery or other electrical generator, is then connected at its opposite poles to the binding-posts $b$ $b'$. The cock is now opened and water allowed to flow into the electrolyzing-chamber between the electrodes E' and C. As it enters at the bottom of the electrolyzing-chamber constituting the narrow space between said electrodes said water causes the current to flow from the source of electrical energy between the electrodes and acts upon every part thereof from the moment that it first enters the vessel until the electrolyzing-chamber is completely filled, the water $w$ finally flowing into the pan P and from thence by way of the pipe or tube K into the filter F, thence upward through the wire-gauze portion G of the filter and the sand M, finally passing through the pipe O into the chamber A in a purified condition. With such an arrangement all animal and vegetable matter assumes a flocculent condition, and as it passes upward through the wire-gauze G and sand M of the filter this flocculent matter is deposited therein and the water in purified condition is stored in the vessel A. When the water reaches a certain definite level in the supply-chamber E at a point determined by the strength of the spring S, the latter lifts by its yielding action the vessel into the position shown in dotted lines, thereby interrupting the circuit between said vessel and the electrode C, thus discontinuing the use of the current, and therefore effecting a material saving, a matter of importance where dry or other batteries are used.

In Fig. 2 I have indicated the fact that the binding-post $b$ might be attached directly to the electrode C, in which event of course the circuit cannot be interrupted automatically.

By the structural arrangement hereinbefore described, and illustrated in the accompanying drawings, I am enabled to quickly take apart the apparatus, as will be apparent on inspection, and to disconnect the filter F from the supply-chamber A and pan P, after which the lid of the filter may be removed and the filter flushed by admitting water therethrough in the opposite direction. The disjointed nature of the several parts of the electrolyzing apparatus makes it possible to separate the parts and quickly clean them, such an apparatus being obviously well adapted for use with existing types of water-coolers.

I do not limit my invention to the specific details of construction illustrated in the accompanying drawings and hereinbefore described, as a number of the features thereof may be departed from and still come within the scope of my claims hereinafter made. I believe it is broadly new with me to provide a water-purifier with an insulating water-chamber constructed in one integral piece and having the electrodes secured thereto in any preferred manner, and my claims are generic as to this feature. My claims are also generic as to the feature of providing automatic means for interrupting the current-flow to the purifier when the water-supply is practically exhausted.

Having thus described my invention, what I claim, and desire to secure by Letters Patent of the United States, is—

1. In an electrical water-purifier an electrolyzing-chamber having its walls and bottom constructed of one integral piece of insulating material and having an electrode secured directly to its inner wall; in combination with a second electrode secured directly to the bottom of the chamber so that all parts of said electrode are located at relatively equal distances from all parts of the first-named electrode, substantially as described.

2. In an electrical water-purifier an electrolyzing-chamber made of insulating material and of cylindrical form with its walls and bottom of one integral piece and having an electrode secured to the inner surface or wall thereof; in combination with a second cylindrical electrode secured at its lower end directly to the bottom of the chamber and concentric with the first-named electrode, substantially as described.

3. An electrical water-purifier having an electrolyzing-chamber and two electrodes therefor; in combination with a water-supply chamber and an automatic circuit-interrupting device adapted to automatically interrupt the circuit between the electrodes when the water-supply has reached a definite amount, substantially as described.

4. An electrical water-purifier having two electrodes located in an electrolyzing-chamber; in combination with circuit-interrupting devices controlled by the supply of water and in such manner that when the latter is nearly exhausted the circuit is interrupted between the electrodes, substantially as described.

5. A combined water purifier and filter having an electrolyzing-chamber and water-conveying means whereby the water is conveyed through the chamber from the bottom toward the top; in combination with a filter connected with the electrolyzing-chamber in such manner that the water enters the filter at the bottom and ascends therethrough, the entire action of the purifier and filter being effected while the water is ascending in each instance, substantially as described.

6. A combined water purifier and filter consisting of a supply-chamber, an electrolyzing-chamber and a filter, the supply-chamber being connected to the electrolyzing-chamber at the bottom thereof and the filter being connected to the electrolyzing-chamber at the top thereof, the filter being so constructed that the water is delivered to the lower end thereof and the entire arrangement such that the purifying action of the purifier is effected while the water is ascending therethrough and the filtering action is effected while the water is ascending through the filter, substantially as described.

7. A combined water purifier and filter consisting of a water-supply chamber; an electrolyzing-chamber and a cooler or receiving supply-chamber; together with a filter, the water-supply chamber and electrolyzing-chamber being located one above the other and both above the receiving-chamber or cooler and the filter detachably secured to the side of the cooler and to the electrolyzing-chamber, substantially as described.

8. A combined water purifier and filter consisting of a water-supply chamber and an electrolyzing-chamber located the one above the other and detachably connected together by a pipe which enters the electrolyzing-chamber at the bottom thereof; in combination with a receiving-chamber or cooler upon which both of the before-mentioned vessels are detachably supported; together with a filter detachably secured to the side of the receiving-chamber and connected by a pipe to the upper part of the electrolyzing-chamber, substantially as described.

In testimony whereof I have signed my name to this specification in the presence of two subscribing witnesses.

HENRY M. LIVOR.

Witnesses:
C. J. KINTNER,
E. C. ROWLAND.